United States Patent
Thoen

(10) Patent No.: US 8,417,797 B2
(45) Date of Patent: Apr. 9, 2013

(54) SYSTEM AND METHOD FOR SEAMLESSLY PROVIDING VIDEO CONTENT TO CLIENT SYSTEMS OVER A NETWORK

(75) Inventor: Gregory S. Thoen, Macedon, NY (US)

(73) Assignee: e-LocalLink, Inc., Rochester, NY (US)

( * ) Notice: Subject to any disclaimer, the term of this patent is extended or adjusted under 35 U.S.C. 154(b) by 112 days.

(21) Appl. No.: 12/368,039

(22) Filed: Feb. 9, 2009

(65) Prior Publication Data

US 2010/0017462 A1 Jan. 21, 2010

Related U.S. Application Data

(62) Division of application No. 10/804,330, filed on Mar. 19, 2004, now Pat. No. 7,873,706.

(51) Int. Cl.
| | |
|---|---|
| *G06F 15/177* | (2006.01) |
| *G06F 15/16* | (2006.01) |
| *G06F 15/167* | (2006.01) |
| *G06F 15/173* | (2006.01) |
| *G06F 11/00* | (2006.01) |
| *H04L 27/00* | (2006.01) |
| *H04B 1/38* | (2006.01) |
| *H04J 3/18* | (2006.01) |
| *H04W 4/00* | (2009.01) |
| *H04N 7/00* | (2011.01) |
| *G09G 5/26* | (2006.01) |
| *G06T 17/00* | (2006.01) |

(52) U.S. Cl. ........ 709/220; 709/206; 709/213; 709/219; 709/223; 709/224; 709/228; 709/233; 709/235; 709/239; 345/428; 345/473; 348/36; 370/235; 370/236; 370/252; 370/327; 370/477; 375/222; 375/295

(58) Field of Classification Search .................. None
See application file for complete search history.

(56) References Cited

U.S. PATENT DOCUMENTS

| | | | |
|---|---|---|---|
| 6,003,065 A | 12/1999 | Yan et al. | |
| 6,072,787 A | 6/2000 | Hamalainen et al. | |
| 6,081,278 A * | 6/2000 | Chen | 345/473 |
| 6,219,089 B1 * | 4/2001 | Driscoll et al. | 348/36 |
| 6,256,669 B1 | 7/2001 | Hurwitz | |
| 6,268,864 B1 * | 7/2001 | Chen et al. | 345/428 |
| 6,337,708 B1 * | 1/2002 | Furlan et al. | 348/36 |
| 6,378,013 B1 * | 4/2002 | Hanson | 710/100 |
| 6,389,473 B1 | 5/2002 | Carmel et al. | |

(Continued)

OTHER PUBLICATIONS http://wayback.archive.org/web/20021115000000*/http://www.strayereducation.com/privacy.cfm Oct. 22, 2002, pp. 1-2, Strayer Education Privacy Policy.*

*Primary Examiner* — Moustafa M Meky
*Assistant Examiner* — Ho Shiu
(74) *Attorney, Agent, or Firm* — LeClairRyan, a Professional Corporation

(57) ABSTRACT

A system and method for providing video content to a client system is disclosed. The system includes a server and a computer coupled by a network. The server obtains operating environment information of the computer in response to a request for video content from the computer. The server selects a version of the requested video content for sending based on the obtained operating environment information. The selected video can be received by the computer at the computer's particular connection speed over the network and can be played by the computer using its particular video player. The server sends the selected video to the computer and causes the computer to automatically begin playing the video without requiring any overt interaction by the operator of the computer.

30 Claims, 6 Drawing Sheets

U.S. PATENT DOCUMENTS

| | | | |
|---|---|---|---|
| 6,505,254 B1 * | 1/2003 | Johnson et al. | 709/239 |
| 6,507,611 B1 * | 1/2003 | Imai et al. | 375/222 |
| 6,594,699 B1 | 7/2003 | Sahai et al. | |
| 6,658,167 B1 | 12/2003 | Lee et al. | |
| 6,751,794 B1 | 6/2004 | McCaleb et al. | |
| 6,996,132 B1 * | 2/2006 | Tolety | 370/517 |
| 7,092,992 B1 * | 8/2006 | Yu | 709/206 |
| 7,379,980 B1 * | 5/2008 | Gilbert | 709/220 |
| 7,423,972 B2 * | 9/2008 | Shaham et al. | 370/236 |
| 2001/0010059 A1 * | 7/2001 | Burman et al. | 709/224 |
| 2001/0039585 A1 * | 11/2001 | Primak et al. | 709/228 |
| 2002/0007419 A1 | 1/2002 | Chang et al. | |
| 2002/0038374 A1 | 3/2002 | Gupta et al. | |
| 2002/0080727 A1 * | 6/2002 | Kim et al. | 370/252 |
| 2002/0083147 A1 * | 6/2002 | Ripperger | 709/213 |
| 2002/0110149 A1 * | 8/2002 | Roberts et al. | 370/477 |
| 2002/0112052 A1 * | 8/2002 | Brittingham et al. | 709/224 |
| 2002/0143861 A1 | 10/2002 | Greene et al. | |
| 2003/0016760 A1 * | 1/2003 | Kruys | 375/295 |
| 2003/0018447 A1 | 1/2003 | Florschuetz | |
| 2003/0028433 A1 * | 2/2003 | Merriman et al. | 705/14 |
| 2003/0041165 A1 * | 2/2003 | Spencer et al. | 709/233 |
| 2003/0103243 A1 * | 6/2003 | Watanabe et al. | 358/405 |
| 2003/0110234 A1 | 6/2003 | Egli et al. | |
| 2003/0182195 A1 | 9/2003 | Kumar | |
| 2003/0233445 A1 * | 12/2003 | Levy et al. | 709/224 |
| 2004/0002367 A1 * | 1/2004 | Chanut | 455/574 |
| 2004/0054787 A1 | 3/2004 | Kjellberg et al. | |
| 2004/0153890 A1 * | 8/2004 | Davis et al. | 714/699 |
| 2005/0015551 A1 | 1/2005 | Eames et al. | |
| 2005/0068889 A1 | 3/2005 | Chavez et al. | |
| 2005/0169467 A1 | 8/2005 | Risan et al. | |

* cited by examiner

SYSTEM AND METHOD FOR SEAMLESSLY PROVIDING VIDEO CONTENT TO CLIENT SYSTEMS OVER A NETWORK

This application is a divisional of U.S. patent application Ser. No. 10/804,330, filed Mar. 19, 2004, which claims the benefit of U.S. Provisional Patent Application Ser. No. 60/455,601, filed Mar. 19, 2003, which is hereby incorporated by reference in its entirety.

FIELD OF THE INVENTION

This invention relates generally to network communications and, more particularly, to a method and system for providing requested video to a client system and enabling the client system to receive and play video without requiring any overt operator interaction.

BACKGROUND

With the proliferation of connections to the Internet by a rapidly growing number of users, the viability of the Internet as a widely accepted medium of communication has increased correspondingly. Internet technology is changing rapidly to cope with ever increasing demands, and the faster the technology changes, the more services users expect from the Internet. For example, users were once satisfied with text and still images on their Web pages, but now they demand video to be delivered quickly and to be presented with a high degree of quality.

Video is often delivered over the Internet in the form of streaming video, although there are other ways to deliver video. With streaming video, lectures or seminars can be broadcast, announcements can be made, or demonstrations on how to do something can be delivered to users. Streaming video allows users to view video over the Internet as the video is being downloaded instead of waiting until the entire file is downloaded. After the user's machine spends a few seconds buffering a portion of the downloaded streaming video, the machine is able to begin playing the video using a video player installed on the machine. Some of the most popular streaming video players currently being used include Windows Media Player®, Apple Quicktime® and RealVideo®. Streaming video has become so common that most client machines, such as personal computers, have one or more streaming video players already installed when purchased from a retailer.

While streaming video has enriched the online experience, users often find accessing the video to be difficult. When a user finds some video content they would like to download from a Website, the user must provide information about their machine's operating environment to the Website. The Website needs this information so it can provide the correct version of the video based on the particular video player installed on the user's machine, the video player's version, the particular operating system installed on the user's machine, the operating system's version, and what network bandwidth speed the user's machine is connected at.

The most common way for a Website to obtain this information is to ask the user a series of questions or provide several drop down menus. However, this requires the users to have some knowledge of their machine's operating environment. Users savvy enough to be able to provide their machine's environment information find this process tedious and cumbersome. Some users may not bother with providing the Website with the information needed to determine the correct version of the video to send. Other users who are not familiar with their machine's environment information will simply give up trying to download the video rather than spend time trying to obtain this information. Aside from depriving the user from viewing the video, there may be other less obvious but far reaching consequences. For instance, the video may contain advertisements in which case the advertisers lose potential sales.

SUMMARY

A system for providing content to a client system in accordance with an embodiment of the present invention includes an assessment system and a content processing system. The assessment system obtains content presentation environment information associated with the client system. The content presentation environment information is based on an operating environment evaluation of the client system that is performed by an evaluation system. The content processing system selects one of a plurality of versions of the content to send the client system using the obtained content presentation environment information.

A method and a program storage device readable by a machine and tangibly embodying a program of instructions executable by the machine for providing content to a client system in accordance with embodiments of the present invention include obtaining content presentation environment information associated with the client system, where the content presentation environment information is based on an operating environment evaluation of the client system, and selecting one of a plurality of versions of the content to send the client system using the obtained content presentation environment information.

A system for determining a current data transfer rate of a client system over a network in accordance with an embodiment of the present invention includes an operation initiation system, a data transmission system, and a current transfer speed detection system. The operation initiation system requests the client system to perform one or more operations. The data transmission system sends data over the network to the client system that the client system needs to perform the one or more requested operations. The current transfer speed detection system then calculates an amount of time taken by the client system to perform the one or more requested operations. The current data transfer rate of the client system is based on the calculated amount of time.

A method and a program storage device readable by a machine and tangibly embodying a program of instructions executable by the machine for determining a current data transfer rate of a client system over a network in accordance with embodiments of the present invention include requesting the client system to perform one or more operations, sending data over the network to the client system that the client system needs to perform the one or more requested operations, and calculating an amount of time taken by the client system to perform the one or more requested operations where the current data transfer rate of the client system is based on the calculated amount of time.

The present invention offers a number of benefits in providing a unique and extensible way of seamlessly delivering video content to client systems. The invention relieves operators of the client systems from having to obtain information about their operating environment and/or having to provide that information to the video content source provider before they can receive the appropriate version of the content that can be processed by their system. Thus, operators no longer have to bother selecting from a series of drop down windows or need to input information to identify the particular video player installed on their client system, the video player's version, the particular operating system installed on their client system, the operating system's version, or what network bandwidth speed the client system is connected at. As a result, client system operators will be more likely to wait for the delivery of requested video content since a lesser amount of effort on their part. This will also lead to greatly expanding the video content viewing audience to include client system operators who are not familiar with their system's operating environment information.

Besides the palpable benefits offered by the present invention in making it easier for operators to request and receive video content, other latent benefits will be realized. Organizations will be able to more effectively leverage using video content for conveying vast amounts of information since the chances that the video is actually received and viewed by operators are greatly increased. By way of example only, advertising organizations will have greater success in ensuring their advertisements embedded in video content are actually being received and viewed by potential customers. Further, organizations will be better positioned to exploit the power of using video for motivating, explaining, educating and capturing an operator's attention.

The present invention can provide these benefits because the invention is able to obtain the operating environment information from the operator's system. The present invention is able to obtain a client system's operating environment information quickly, such as in a matter of seconds. Furthermore, the present invention is scalable and degrades gracefully because the invention provides the best possible video experience to operators regardless of the client system's processing capacity and network bandwidth speed the system is connected at. Further, the present invention is advantageous since operators do not need to download and install any additional software or update their existing video player to be able to seamlessly request, receive, and play the video. Still further, the invention provides a unique way of determining a client system's network bandwidth speed so that the appropriate version of the video for the particular client system can be delivered and played by the system in the best manner available by the particular video player installed on the system.

DETAILED DESCRIPTION

A system 10 and method for providing content to a client system in accordance with embodiments of the present invention are generally shown in FIGS. 1, 4A, 4B and 5. The system 10 includes a server 12 and a computer 14, although the system 10 can include a lesser or greater number of devices and/or systems. The server 12 obtains operating environment information of the computer 14 in response to a request for video content, selects a version of the requested video content that can be received by the computer 14 at the computer's particular connection speed and can be played by the computer 14 using its particular video player, sends the selected video to the computer 14, and causes the computer 14 to automatically begin playing the video without requiring any overt interaction by the operator of the computer 14. The system 10 provides a number of benefits, such as seamlessly delivering video content to client systems. The system 10 also relieves the operators of the client systems from having to know, obtain or provide their system's operating environment information before they can receive and play the video content. Additionally, the system 10 can efficiently determine a client system's practical connection speed over a network 16.

Figure 1:
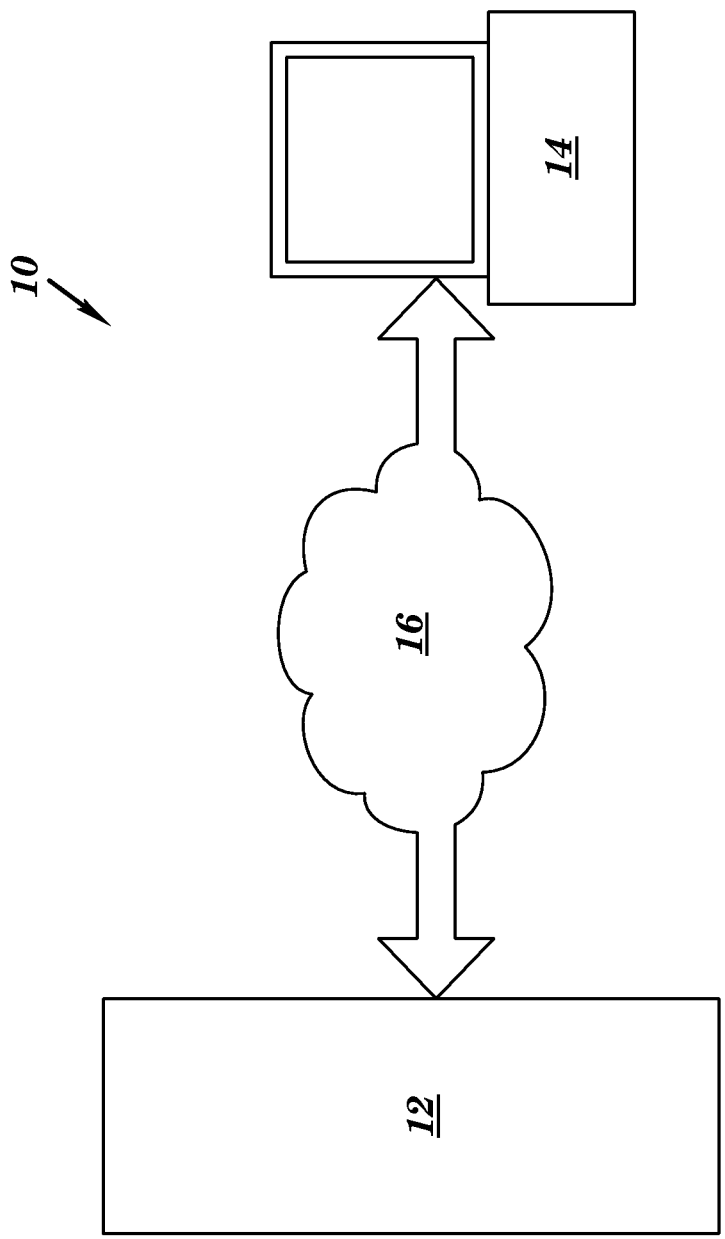
FIG. 1 is a diagram of a system for providing content to a client system in accordance with an embodiment of the present invention.
Figure 2:
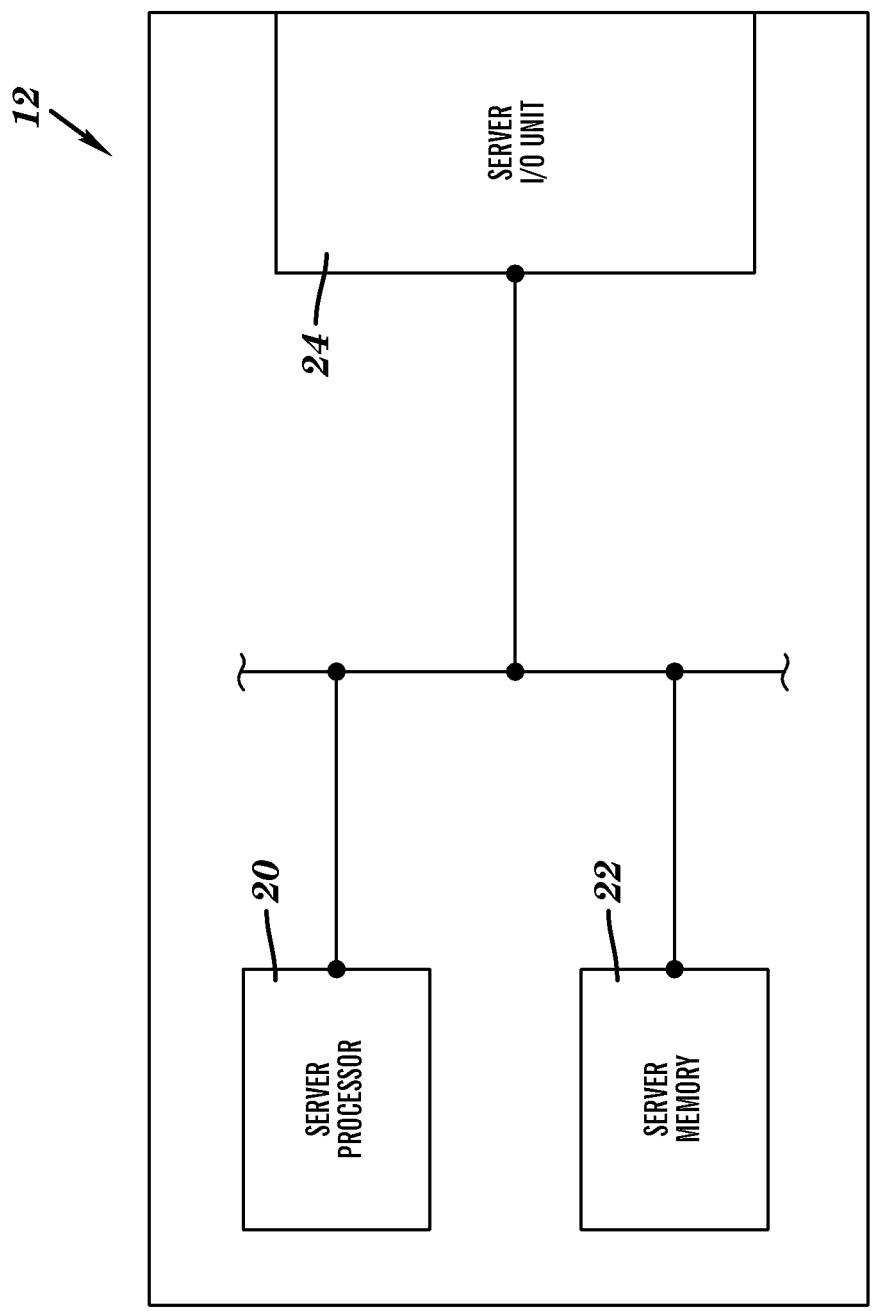
FIG. 2 is a block diagram of a server used in the system shown in FIG. 1.
Figure 4A:
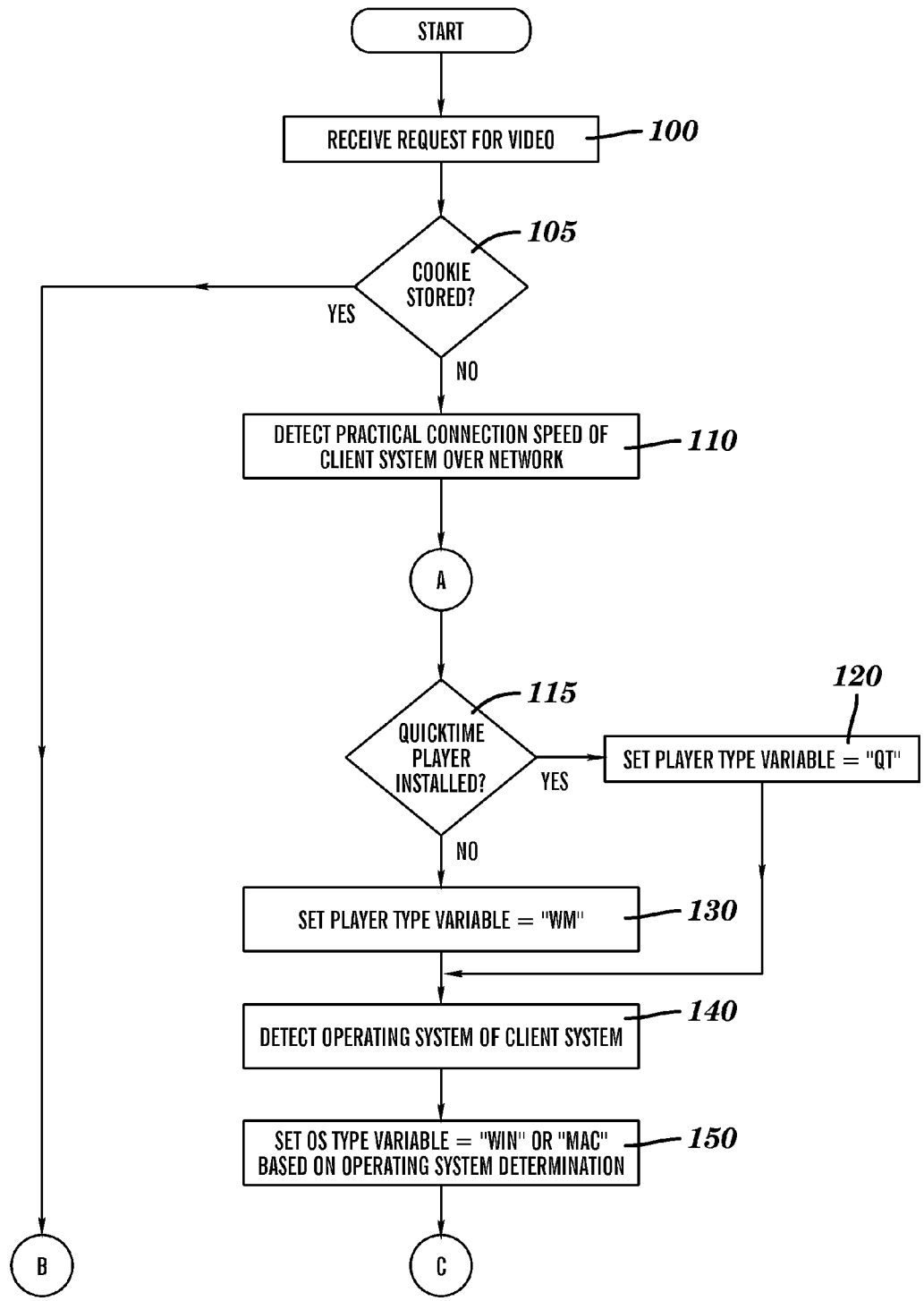
FIGS. 4A-4B are flow charts of a process for providing content to a client system in accordance with another embodiment of the present invention.

Referring to FIG. 1, the server 12 and computer 14 are communicatively coupled to each other by the network 16. The server 12 and computer 14 are provided for exemplary purposes only and may comprise other devices, such as laptop computers, personal digital assistants, and cellular telephones. Referring to FIG. 2, the server 12 comprises a server processor 20, a server memory 22 and a server I/O unit 24, all of which are coupled together by one or more bus systems or other communication links, although the server 12 can comprise other elements in other arrangements. The server processor 20 executes instructions stored in the server memory 22 to perform at least a portion of a method for providing content to a client system in accordance with at least one of the embodiments of the present invention as described herein and which is illustrated in FIGS. 4-5, although the server processor 20 may perform other types of functions.

The server memory 22 comprises one or more types of fixed or portable memory accessible by the server processor 20, such as ROM, RAM, SRAM, DRAM, DDRAM, hard and floppy-disks, CDs, DVDs, magnetic tape, optical disk, ferroelectric and ferromagnetic memory, electrically erasable programmable read only memory, flash memory, charge coupled devices, smart cards, or any other type of computer-readable media, which are read from and/or written to by a magnetic, optical, or other reading and/or writing system coupled to the server processor 20 or other processing system. The server memory 22 stores data and instructions which are executed by the server processor 20 to perform at least a portion of the method for providing content to a client system, although the memory 22 may store other data and instructions, and the data and instructions may be stored elsewhere, such as the computer memory 32. The stored instructions are expressed as executable programs written in a number of conventional or later developed programming languages that can be understood and executed by the server processor 20.

The server I/O unit 24 comprises a communication interface that enables the server 12 to transmit data to or receive data from the computer I/O unit 34 in the computer 14 via the network 16, although the unit 24 may comprise other types of communication interfaces and may be able to transmit data to or receive data from other devices.

Figure 3:
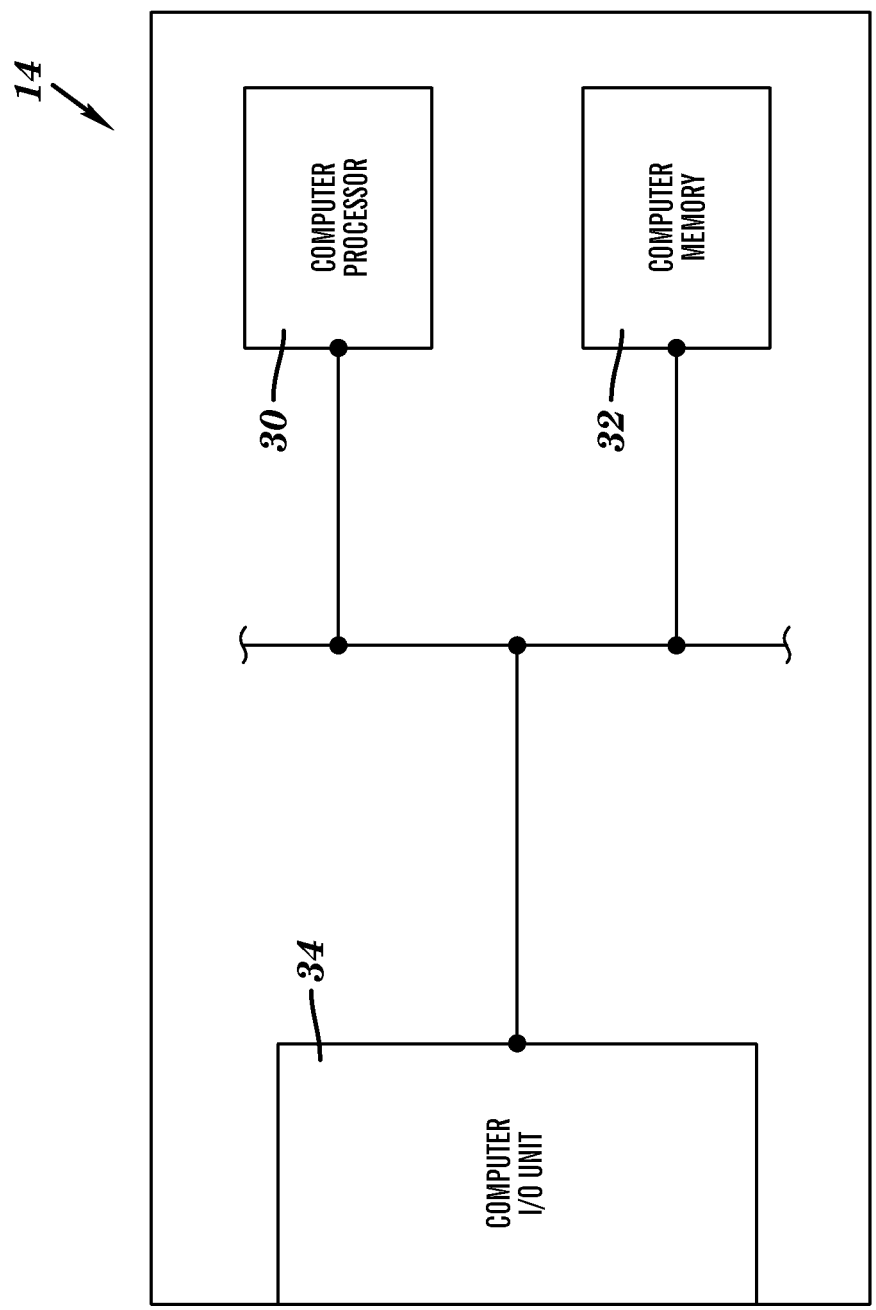
FIG. 3 is a block diagram of a computer used in the system shown in FIG. 1.

Referring to FIG. 3, the computer 14 comprises a computer processor 30, a computer memory 32, a computer I/O unit 34, an input system (not illustrated) and a display system (not illustrated), all of which are coupled together by one or more bus systems or other communication links, although the computer 14 can comprise other elements in other arrangements. The computer processor 30 executes instructions stored in the computer memory 32 to perform at least a portion of the method for providing content to a client system in accordance with at least one of the embodiments of the present invention as described herein and which is illustrated in FIGS. 4-5, although the computer processor 30 may perform other types of functions.

The computer memory 32 comprises the same types of memory storage devices as the server memory 22 in the server 12 (although other types of memory may be used), which is read from and/or written to by a magnetic, optical, or other reading and/or writing system coupled to the computer processor 30 or other processing system. The computer memory 32 stores data and instructions which are executed by the computer processor 30 to perform at least a portion of the method for providing content to a client system, although the memory 32 may store other data and instructions, and the data and instructions may be stored elsewhere, such as the server memory 22. The stored instructions are expressed as executable programs written in a number of conventional or later developed programming languages that can be understood and executed by the computer processor 30.

The computer I/O unit 34 comprises a communication interface that enables the computer 12 to transmit data to or receive data from the server I/O unit 24 in the server 12 via the network 16, although the unit 34 may comprise other types of communication interfaces and may be able to transmit data to or receive data from other devices. The input system of the computer 14 comprises one or more devices, such as a keyboard and/or mouse, which enables an operator to generate and transmit signals or commands to the computer processor 30, such as a request to obtain video content from a Web site, although other types of systems may be used. The display system of the computer 14 comprises a computer monitor (e.g., CRT, LCD or plasma display device), which presents video content sent from the server 12 to operators of the computer 14, although other types of display systems may be used and other types of content may be presented.

The network 16 comprises the Internet, although a variety of communication systems and/or methods using appropriate protocols can be used, including serial or parallel bus cables, local area networks, wide area networks, phone lines, coaxial cables, wireless communication technology, and combinations thereof.

A method for providing content to a client system in accordance with another embodiment of the present invention will now be described with reference to FIGS. 4-5 in the context of being carried out by the system 10 described above in connection with FIGS. 1-3. Referring to FIG. 4A and beginning at step 100, by way of example only, an operator of the computer 14 using the computer's input system, in conjunction with operation of the computer processor 30, computer memory 32 and computer I/O unit 34, requests a Web page from the server 12. For example, the operator enters a URL in a Web browser operated by the computer 14 to request the Web page from the server 12, although the page can be found using search engines. The server 12, in conjunction with the operation of the server processor 20, server memory 22 and server I/O unit 24, receives the Web page request from the computer 14 and sends the requested Web page over the network 16 to the computer 14. This Web page is coded using hypertext markup language ("HTML"), although other languages and methodologies may be used, such as XML, XHTML, JavaScript, Java, Perl, Visual Basic, Hypertext Preprocessor scripts ("PHP"), Active Server Page scripts ("ASP"), common gate interface ("CGI") scripts, server side includes, and combinations thereof.

The computer 14 receives the Web page and the Web browser on the computer 14 parses the HTML within the page to display the Web page to the operator using the computer's display system, although the Web browser may utilize other applications operated by the computer 14 to enable the browser to parse any other languages embedded in the code embodying the Web page. The displayed Web page bears one or more hyperlinks to video content that is available for downloading from the server 12 by the computer 14, although other methods besides hyperlinks may be used to select the video content, other types of content may be available for downloading, such as audio content, hypertext content or word processing content, and the content may be downloaded from other sources.

By way of example only, the operator of the computer 14 finds some interesting video content on the Web page and selects a hyperlink on the page that is associated with that content. The Web browser on the computer 14 sends video content request information associated with the selected hyperlink in the code embodying the Web page to the server 12, such as a database identifier for the selected content and a reference to a video content process Web page, although other information may be sent to the server 12. The server 12 receives the video content request information and retrieves a video content process Web page from the server memory 22 for further processing as described further herein below, although the page may be retrieved from other sources. The video content process Web page is coded using a combination of HTML, PHP script and JavaScript, although other languages and other combinations of languages may be used.

The server 12 begins interpreting the video content process Web page to obtain operating environment information of the computer 14 and to generate a video viewing Web page for the computer 14 as described in further detail below in connection with step 230. The server processor 20 in the server 12 interprets one or more sets of PHP script embedded in the code embodying the video content process Web page using a PHP interpreter application stored in the server memory 22, although the application may be stored elsewhere and other applications may be used where other languages are embedded in the code. Thus, the server processor 20 interprets the one or more portions of the PHP script in the code and executes the instructions expressed in those scripts which cause the processor 20 to operate as described below in connection with steps 105-230.

By executing the PHP scripts embedded in the code embodying the video content process Web page, the server processor 20 is instructed to send one or more client processing Web pages to the computer 14 over the network 16. These one or more client processing Web pages are coded using a combination of HTML, Javascript and Visual Basic, although other languages and other combinations of languages may be used. The code embodying the client processing Web pages instruct the computer 14 to provide information to the server 12 when the Web browser on the computer 12 parses the code embodying the one or more client processing Web pages, although the server 12 may instruct the computer 12 to provide the information directly using other methods.

At step 105, the server processor 20 in the server 12 determines whether operating environment information for the computer 14 is available for retrieval from the computer memory 32 in the computer 14. In particular, the server 12 determines whether a cookie file that includes the environment information for the computer 14 is stored at the computer memory 32, although the environment information may be stored in other ways besides a cookie file and at other locations, such as at the server 12, elsewhere on the network 16, or any other location. Further, the cookie file will have been stored by the Web browser operating on the computer 14 as described below in connection with step 210 (FIG. 4B), although the cookie file may be stored in the computer memory 32 by other systems on the network 16 besides the server 12 or the computer 14. If the server 12 determines that the cookie file is stored at the computer memory 32, then the YES branch is followed and step 211 is performed as described further herein below in connection with FIG. 4B. Otherwise, the NO branch is followed.

At step 110, by way of example only, the server 12 determines above at step 105 that there is no cookie file that is available for retrieval from the computer 14. Accordingly, the server 12 obtains the operating environment information from the computer 14 as described further herein below. The server 12 begins by determining the practical connection speed of the computer 14 for sending and receiving data, such as video content, via the network 16, although the server 12 may begin by determining other types of operating environment information.

A method for determining the practical connection speed of the computer 14 over the network 16 in accordance with another embodiment of the present invention will now be described with reference to FIG. 5, although other methods for detecting the connection speed of the computer 14 may be used. Referring to FIG. 5 and beginning at step 300, the server 12 stores an initial or current clock time at the server memory 22, although other information may be stored, such as date information. The time information is stored in milliseconds, although other increments of time may be used.

At step 310, the server 12 instructs the computer 14 to render a relatively small image associated with an image file stored in the server memory 22, such as a forty-six KB GIF image file, although the server 12 may instruct the computer 14 to perform other types of operations, other file sizes may be used, such as a range of file sizes between forty and seventy KB, other image file formats may be used, other types of files besides image files may be used, and the file may be stored elsewhere.

At step 320, the server 12 determines whether the computer 14 has completed rendering the image file. In particular, the server 12 determines whether a flag stored in server memory 22 has been set by the server processor 20 to indicate that a notification has been received from the computer 14 that the image file has been rendered, although the server 12 may determine that the computer 14 has completed rendering the image file by other means, such as receiving a message directly from the computer 14 over the network 16 or interrogating the computer 14 to determine whether the image file has been rendered.

At step 325, if the server 12 determines that the computer 14 has not completed rendering the image file, then the NO branch is followed and steps 322-330 (step 330 is described further herein below) are performed by the server 12 until the server 12 determines at step 325 that the computer 14 has completed rending the image file or until a maximum time limit has elapsed as described below in connection with step 330. If the server 12 determines that the computer 14 has completed rendering the image file, then the YES branch is followed.

At step 330, the server 12 determines whether a maximum time limit has elapsed for waiting for the computer 14 to complete rendering the image file. The amount of elapsed time used for the maximum time limit in this example is approximately three seconds, although other amounts of time may be used and the amount of time may be set according to an initial connection speed for the computer 14 over the network 16, or the amount of time may be set according to other factors. If the server 12 determines that the amount of time which has elapsed from when the server 12 instructed the computer 14 to render the image file is less than the maximum time limit, then the NO branch is followed. However, if the server 12 determines that the maximum time limit has been reached or exceeded, then the YES branch is followed and step 370 is performed as described below, although the server 12 may determine that the computer 14 has aborted rendering the image file or is otherwise unavailable in which case the method ends. Using a maximum time limit is advantageous because the server 12 can determine that the practical connection speed of the computer 14 over the network 16 is below a first bandwidth threshold and thus no further processing resources of the server 12 and/or time will be spent waiting for the computer 14 to complete rendering the image file.

At step 340, the server 12 stores the current clock time of when the computer 14 completed rendering the image file at the server memory 22, although other information may be stored, such as date information. Again, the time information is stored in milliseconds, although other increments of time may be used.

At step 350, the server 12 calculates the practical connection speed of the computer 14 using the initial clock time stored by the server 12 at step 300 (representing the time at which the computer 14 was instructed to render the image file) and the completion time stored by the server 12 at step 340 (representing the time at which the computer 14 completed rendering the image file). Basically, the amount of time that has elapsed between the initial clock time and the completion clock time corresponds to the amount of time taken by the computer 14 to receive the image file over the network 16. However, there are some factors that may affect the amount of time that elapses. These factors include time elapsing that is not related to the actual transmission of the image file over the network 16, such as the amount of time required for the server 12 to instruct the computer 14 to render the image file, the amount of time used by the computer 14 in order to process the image file during the rendering, and other factors.

Thus, the server 12 adjusts the total amount of elapsed time between the initial time and the completion time calculated by the server 12 to account for these factors, such as by subtracting from the total amount of elapsed time an expected or estimated amount of time taken by the server 12 to instruct the computer 14 to render the image file, an expected or estimated amount of time taken by the computer 14 to process the instructions for rendering the image file, or an expected or estimated amount of time taken by the computer 14 for rendering the image file, although adjustments may be made for other reasons. This helps the server 12 make a more precise determination of the practical connection speed of the computer 14 over the network 16. The server 12 then calculates the practical connection speed of the computer 12 over the network 16 based on the adjusted total amount of elapsed time for rendering the image file and the size of the image file, although the server 12 may use other information.

At step 355, the server 12 determines whether the practical connection speed of the computer 14 calculated above at step 350 meets or exceeds a high bandwidth threshold stored in the server memory 22. By way of example only, the server 12 may associate a high bandwidth threshold with a practical connection speed of one megabyte per second, although other values may be used. If the server 12 determines that the practical connection speed of the computer 14 does not exceed the high bandwidth threshold (e.g., one megabyte per second), then the NO branch is followed. However, if the server 12 determines that the practical connection speed of the computer 14 meets or exceeds the high bandwidth threshold, then the YES branch is followed.

At step 360, the server 12 assigns a bandwidth variable stored in the server memory 22 a value indicating that the practical connection speed of the computer 14 exceeds the high bandwidth threshold, such as "HIGHBAND," and this value is stored in the server memory 22 for further processing as described herein, although other values may be used. The method continues to step 375 as described further herein below.

At step 370, since the server 12 determines that the practical connection speed of the computer 14 over the network 16 does not exceed the high bandwidth threshold at step 355, the server 12 assigns the bandwidth variable a value indicating that the practical connection speed of the computer 14 does not exceed the high bandwidth threshold, such as "LOW-BAND," and this value is stored in the server memory 22 for further processing as described herein, although other values may be used. It should be appreciated that the bandwidth variable may be associated with any number of and different types of values indicating the practical connection speed of the computer 14. This provides the ability to identify one of a plurality of ranges of connection speeds that the practical connection speed of the computer 14 corresponds to besides just the exemplary low and high bandwidth ranges used herein.

In performing steps 300-370, the server 12 is basically determining the practical connection speed of the computer 14 by measuring the amount of time it takes for the computer 14 to download the image file from the server 12 to be able to render the image once the computer 14 has received all of the data embodying the image file over the network 16. This provides a unique method of determining the practical connection speed of the computer 14 over the network 16 that will work with most, if not all, types of systems (e.g., computer 14) regardless of the hardware or software components employed by these systems. Because the size of the image file is relatively small and the method incurs low processing overhead on the part of the server 12 and computer 14, systems with limited processing capacity and/or relatively slow connection speeds over the network 16, such as systems connected to the network 16 via phone line dial-up connections, will not be hindered. Moreover, systems that are connected to the network 16 via slow telephone dial-up connections may not even realize that this detection process is taking place (or has taken place).

Furthermore, determining the practical connection speed of the computer 14 over the network 16 accounts for changes in the rate at which the computer 14 can receive data from the network 16. The rate at which the computer 14 is expected to be able to receive data from the network 16 may be different from the practical connection speed of the computer 14 over the network 16. For instance, processing demands imposed on the server 12 and/or the computer 14 may fluctuate or traffic on the network 16 may change, which could alter the practical connection speed. If a version of streaming video content is formatted for transmission to the computer 14 over the network 16 with the assumption that the computer 14 will be able to receive this video over the network 16 at a particular speed, and the practical connection speed of the computer 14 deviates from the assumed particular speed, the quality of the video content when played by the computer 14 may be deprecated or the computer 14 may not be able to play the video at all. Thus, determining the practical connection speed ensures that a version of the video content sent to the computer 14 is formatted appropriately for the particular practical connection speed of the computer 14 over the network 16 at the time the video is requested.

At step 375, the method for providing content to a client system continues to step 115 as described herein below with reference back to FIG. 4A.

Referring back to FIG. 4A, at step 115, the server 12 determines whether the computer memory 32 in the computer 14 stores instructions, which when executed by the computer processor 30, operate a QuickTime® video player application. The server 12 determines whether the computer 14 operates the QuickTime® video player based on JavaScript code embedded in a client processing Web page sent to the computer 14, which when parsed by the Web browser on the computer 14, causes the computer 14 to send the information to the server 12. In particular, the computer 14 returns a value indicating whether it operates the QuickTime® video player, such as a Boolean true or false value, although other types of values may be used and the server 12 may determine whether the computer 14 operates the QuickTime® video player using other methods. If the server 12 determines that the computer 14 is operating the QuickTime® video player, then the YES branch is followed. Otherwise, the NO branch is followed.

At step 120, the server 12 assigns a playertype variable stored in the server memory 22 a value indicating that the computer 14 operates the QuickTime® video player, such as "QT," although other values and variables may be used. The method for providing content to a client system as described herein proceeds to step 140.

At step 130, since the server 12 determined above at step 115 that the computer 14 does not operate the QuickTime® video player, the server 12 determines that the computer 14 is operating a Windows Media Player® video player and assigns the playertype variable a value indicating this determination, such as "WM," although other values may be used and other video players may be determined to be operated by the computer 14. It should be appreciated that the Windows Media Player® and QuickTime® video players are provided for exemplary purposes only. Thus, the server 12 may determine whether the computer 14 operates other types of video players, such as RealVideo®. Moreover, the server 12 may determine whether the computer 14 operates other types of content player devices besides video players, such as audio players, HTML Web page editor applications, and word processing applications.

At step 140, the server 12 determines the type of operating system that the computer 14 operates in the same manner with respect to the server 12 determining the type of video player the computer 14 operates as described above in connection with steps 115 and/or 130. Additionally, the server 12 determines other operating environment information of the computer 14, such as the version of the operating system operated by the computer 14, the type and version of the Web browser operated by the computer 14, and other information, in the same manner with respect to the server 12 determining the type of video player the computer 14 operates as described above in connection with steps 115 and/or 130, although other methods may be used.

By way of example only, the server 12 may determine the type of Web browser the computer 14 operates (e.g., Internet Explorer®, Netscape Navigator®) based on JavaScript code embedded in a client processing Web page sent to the computer 14 which when parsed and interpreted by the Web browser on the computer 14 causes the computer 14 to send the Web browser type information to the server 12, or the server 12 may obtain this information when the server 12 interprets a portion of the PHP script (or other script) embedded in the code embodying the video content process Web page at step 105. In particular, the server 12 may extract information identifying the particular type of Web browser operated by the computer 14 from a user agent string sent along with the HTTP request from the computer 14 for the Web page bearing the hyperlinks to the available video content at step 100.

At step 150, the server 12 assigns an OS type variable stored in the server memory 22 a value identifying the type of operating system operated by the computer 14 that is determined above at step 140, such as "WIN" or "MAC," corresponding to the Windows® and MacIntosh® operating systems, respectively, although other types of operating systems may be determined. The method continues to step 155 described herein below in connection with FIG. 4B.

Figure 4B:
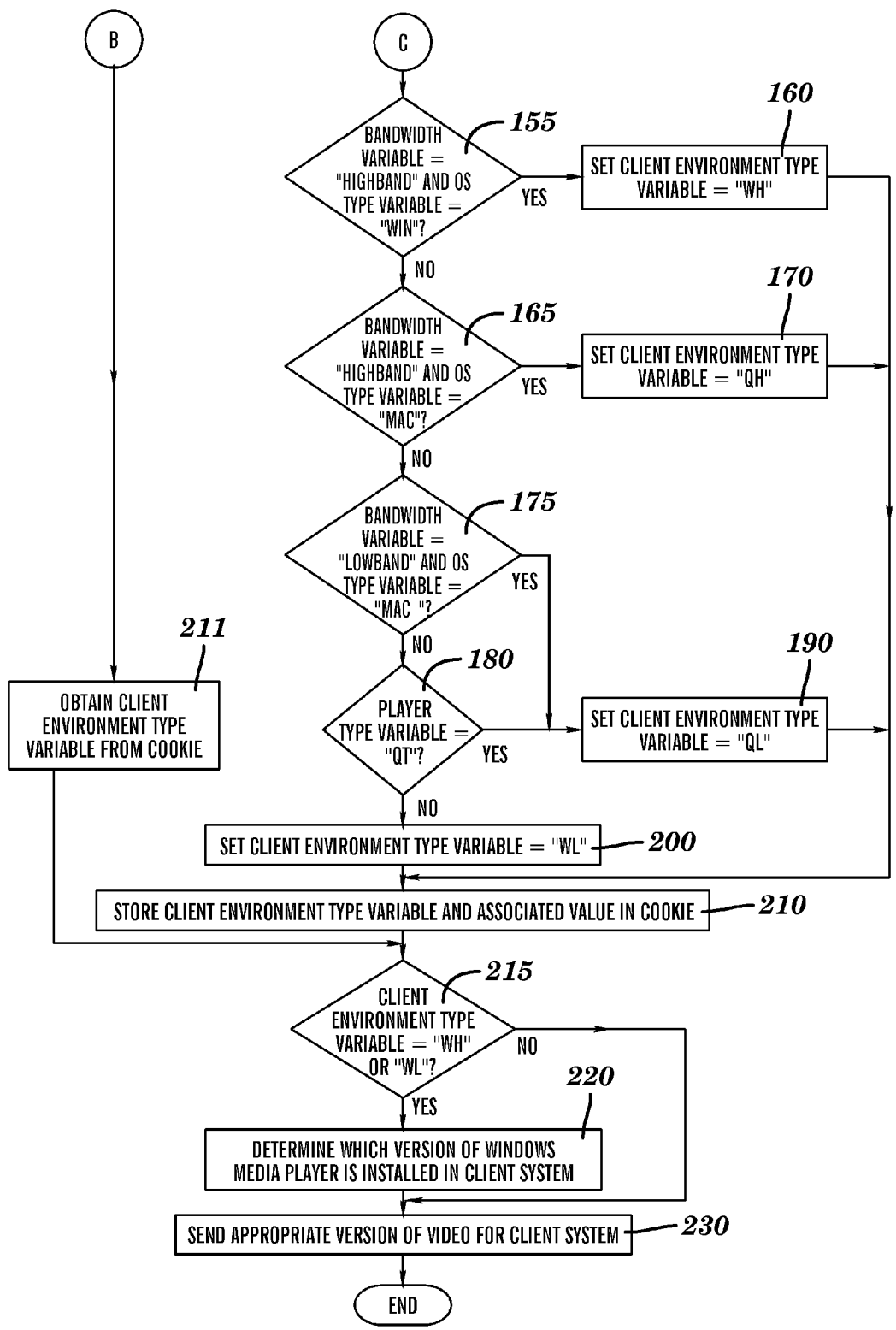
Figure 5:
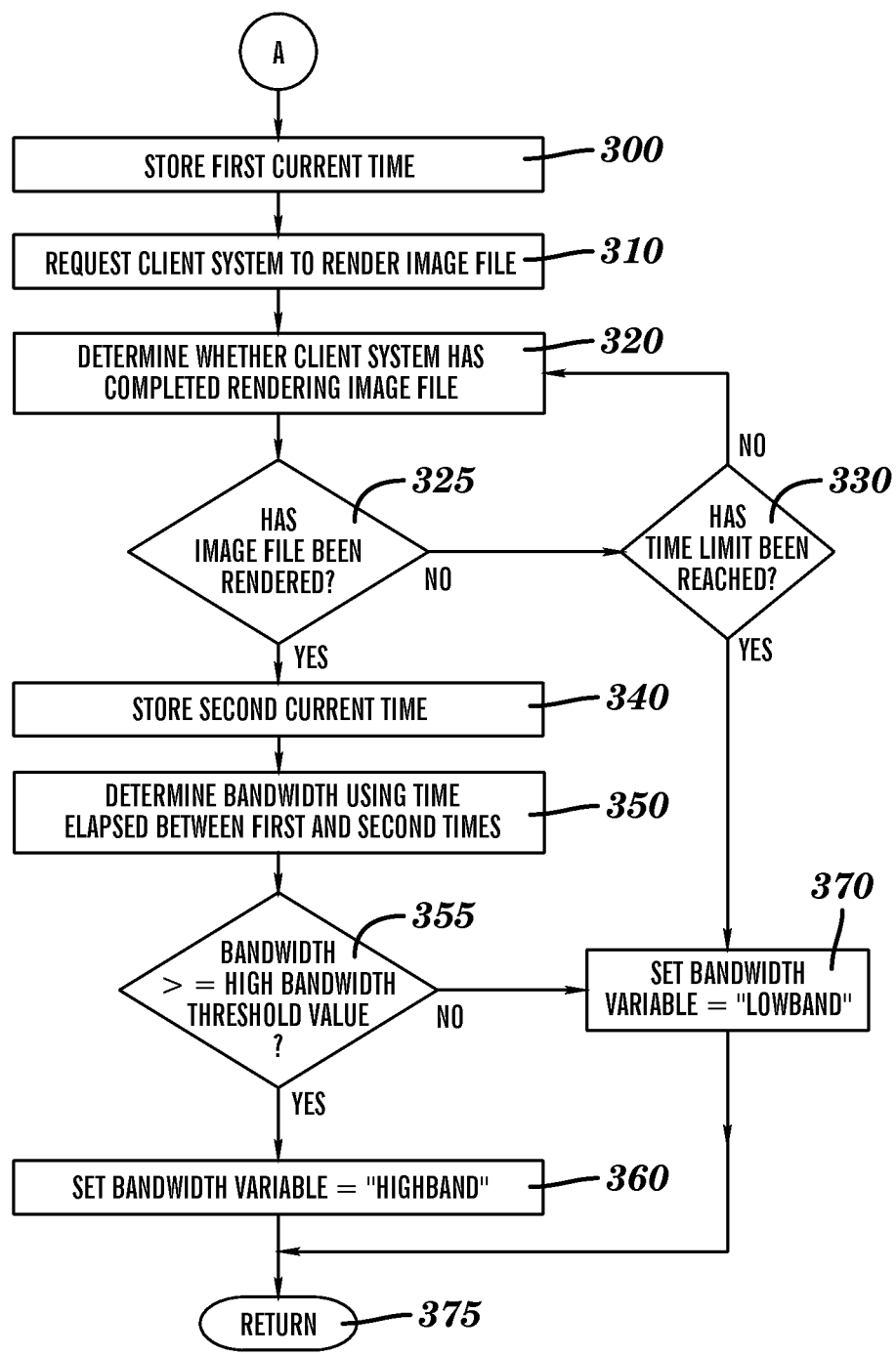
FIG. 5 is a flow chart of a process for determining the practical connection speed of a client system over a network in accordance with yet another embodiment of the present invention.

Referring to FIG. 4B, at step 155, the server 12 determines whether the bandwidth variable was assigned a value of "HIGHBAND" at step 360 and whether the OS type variable was assigned a value of "WIN" at step 150. If the server 12 determines that the bandwidth variable was assigned a value of "HIGHBAND" and that the OS type variable was assigned a value of "WIN," then the YES branch is followed. Otherwise, the NO branch is followed.

At step 160, the server 12 assigns a client environment type variable stored in the server memory 22 with a value, such as "WH," which indicates that the computer 14 has a practical connection speed over the network 16 corresponding to a high bandwidth and that the computer 14 operates a Windows Media Player® video player, although other values may be used and the client environment type variable or other variables may be assigned values indicating other operating environment characteristics of the computer 14. The method for providing content to a client system then proceeds to step 210 as described further herein below.

At step 165, the server 12 determines whether the bandwidth variable was assigned a value of "HIGHBAND" at step 360 and whether the OS type variable was assigned a value of "MAC" at step 150. If the server 12 determines that the bandwidth variable was assigned a value of "HIGHBAND" and that the OS type variable was assigned a value of "MAC," then the YES branch is followed. Otherwise, the NO branch is followed.

At step 170, the server 12 assigns the client environment type variable with a value, such as "QH," which indicates that the computer 14 has a practical connection speed over the network 16 corresponding to a high bandwidth and that the computer 14 operates a QuickTime® videoplayer, although other values may be used and the type variable or other variables may be assigned values indicating other operating environment characteristics of the computer 14. The method for providing content to a client system then proceeds to step 210 as described further herein below.

At step 175, the server 12 determines whether the bandwidth variable was assigned a value of "LOWBAND" at step 370 and whether the OS type variable was assigned a value of "MAC" at step 150. If the server 12 determines that the bandwidth variable was assigned a value of "LOWBAND" and that the OS type variable was assigned a value of "MAC," then the YES branch is followed. Otherwise, the NO branch is followed.

At step 180, the server 12 determines whether the player-type variable was assigned a value of "QT" at step 120. If the server 12 determines that the playertype variable was assigned a value of "QT," then the YES branch is followed. Otherwise, the NO branch is followed.

At step 190, the server 12 assigns the client environment type variable a value, such as "QL," which indicates that the computer 14 has a practical connection speed over the network 16 corresponding to a low bandwidth and that the computer 14 is operating a QuickTime® video player, although other values may be used and the type variable or other variables may be assigned values indicating other operating environment characteristics of the computer 14. The method for providing content to a client system then proceeds to step 210 as described further herein below.

At step 200, the server 12 assigns the client environment type variable a value, such as "WL," which indicates that the computer 14 has a practical connection speed over the network 16 corresponding to a low bandwidth and that the computer 14 is operating a Windows Media Player® video player, although other values may be used and the type variable or other variables may be assigned values indicating other operating environment characteristics of the computer 14.

At step 210, the server 12 instructs the computer 14 to store, at the computer memory 32, the client environment type variable and the value assigned to the variable at one of steps 160, 170, 190 and 200, although the client environment type variable and its associated value can be stored elsewhere. In particular, one or more HTML statements embedded in a client processing Web page sent to the computer 14 that are parsed and interpreted by the Web browser on the computer 14 cause the Web browser, and hence the computer processor 30, to store the client environment type variable and its associated value in a cookie file at the computer memory 32 that is associated with the server 12, although the client environment type variable and its associated value may be stored in other ways besides a cookie file.

The client environment type variable and its associated value in the cookie file represent the operating environment information for the computer 14 with respect to the computer 14 being able to receive and play video content sent from the server 12. This is highly beneficial since the cookie file can be retrieved by the server 12 upon determining the cookie file is available at step 105 when the computer 12 makes subsequent requests for video content as described above in connection with step 100. As a result, it will not be necessary to repeat steps 110-210 since the operating environment information of the computer 14 is available.

However, even when the server 12 determines at step 105 that the cookie file is available for retrieval, steps 110-230 can optionally be performed to determine whether any portions of the operating environment information of the computer 14 have changed, such as the type of video player operated by the computer 14. Alternatively, when the server 12 determines at step 105 that the cookie file is available for retrieval, just steps 110 and 300-370 can optionally be performed to determine the practical connection speed of the computer 14 over the network 16. This would ensure the current practical connection speed of the computer 14 at the time the request is made for the video content is known by the server 12. As discussed above in connection with steps 300-370, determining the practical connection speed of the computer 14 over the network 16 is beneficial for several reasons, such as for enabling the server 12 to select the appropriate version of the video content for sending to the computer 14 to ensure the computer 14 will be able to play the video. The method for providing content to a client system continues to step 215 as described further herein below.

At step 211, if the server 12 determined above at step 105 that the cookie file was available for retrieval from the computer memory 32, then the server 12 obtains the client environment type variable and its associated value from the cookie file stored in the computer memory 32.

At step 215, the server 12 determines whether the client environment type variable was assigned a value of "WH" or "WL" at steps 160 or 200, respectively. If the server 12 determines that the client environment type variable was assigned a value of "WH" or "WL," then the YES branch is followed. Otherwise, the NO branch is followed.

At step 220, the server 12 determines the version number of the Windows Media Player® video player operated by the computer 14 in the same manner the server 12 determines the type of operating system or the type of Web browser that the computer 14 operates as described above in connection with step 140, although the server 12 may use other methods. By way of example only, the server 12 determines whether the version number of the Windows Media Player® video player is version 6.4, version 7.1, or a version later than version 7.1, although the server 12 may determine whether the computer 14 operates other versions of Windows Media Player®, the server 12 may determine the version number of the Quick-Time® video player if operated by the computer 14, the server 12 may determine the version number of any other video players determined to be operated by the computer 14, or the server 12 may determine the version number of any other types of content players, such as audio content players, determined to be operated by the computer 14. When the server 12 determines the version number of the Windows Media Player®, the server 12 assigns a version number variable stored in the server memory 22 a value indicating the determined version, although the server 12 may use other methods to indicate the version of the Windows Media Player®.

At step 230, the server 12 uses at least a portion of the operating environment information of the computer 14 to determine the appropriate version of the video content selected by the operator of the computer 14 at step 100 for sending to the computer 14. As discussed above, the operating environment information is indicated by the value assigned to the client environment type variable at one of steps 160, 170, 190 and 200. A plurality of versions of the video content are stored in the server memory 22, although the video may be stored elsewhere. Each version of the video content is formatted to be received by a client system, such as the computer 14, at a particular data transfer rate and to be played by a particular video player operated by the client system.

By way of example only, a first version of the video content may be formatted to be received by a client system that has a high bandwidth practical connection speed over the network 16 (e.g., at least one megabyte per second data transfer rate) and formatted to be played by the client system operating a Windows Media Player® video player. A second version of the same video content may be formatted to be received by a client system that has a low bandwidth practical connection speed over the network 16 (e.g., less than one megabyte per second data transfer rate) and formatted to be played by the client system operating a Quicktime® video player. In this example, if the client environment type variable was assigned a value of "WL" at step 200, then the server 12 selects the version of the video content that is formatted to be received by the computer 14 identified as having a low bandwidth practical connection speed over the network 16 and formatted to be played by the computer 14 operating a Windows Media Player® video player.

Further, if the server 12 determines above at step 215 that the client environment type variable is associated with a value of "WH" or "WL," then the server 12 selects the appropriate version of the video content for sending to the computer 14 that will enable the computer 14 to play the video content using the Windows Media Player® version 6.4 or 7.1 or higher video player and which can be received by the computer 14 having a low or high bandwidth connection speed over the network 16. For instance, there may be two versions of the video content corresponding to a client environment type variable value of "WH" where both versions can be received by the computer 14 having a high bandwidth connection speed over the network 16, but one version of the video can be played by the computer 14 operating the Windows Media Player® version 6.4 and the other version of the video can be played by operating the Windows Media Player® version 7.1 or higher.

The server 12 completes generating the video viewing Web page for the computer 14 after interpreting the one or more sets of the PHP script embedded in the code embodying the video content process Web page described earlier in connection with step 100. As the server 12 interprets the PHP scripts embedded in the code, the server 12 replaces the PHP scripts with HTML and/or JavaScript which include information for playing the video content, although the scripts may be replaced with other information besides HTML and/or JavaScript. The information for playing the video content identifies the particular video content selected by the operator of the computer 14 at step 100, the location of the appropriate version of the selected video content at the server memory 22 or elsewhere, window and/or frame size information for the Web browser and/or the video player operating on the computer 14 that is appropriate for the selected version of the video content to be sent, formatting information for the Web browser and/or the video player, such as information for removing frame borders, data transfer rate information that the computer 14 can expect the server 12 to transmit the video content at, file size information, instructions for the computer 14 to operate its video player to begin playing the video content, and other information.

The server 12 sends the video viewing Web page to the computer 14 over the network 16. The computer 14 receives the video viewing Web page and the Web browser on the computer 14 parses the code embodying the Web page. The HTML and/or JavaScript in the code embodying the video viewing Web page when parsed by the Web browser on the computer 14 instruct the computer 14 to begin operating its video player application to play the appropriate version of the video content for the computer 14 that is selected by the server 12 and sent from the server 12. Accordingly, the server 12 retrieves the appropriate version of the video content for the computer 14 from the server memory 22 and sends the video to the computer 14 over the network 16 at the appropriate data transfer rate for the computer 14 as determined above.

As a result, the computer 14 is able to begin playing the appropriate version of the video content immediately after the video content is selected and requested by the operator of the computer 14 at step 100. It should be appreciated that when the video content is requested by the operator of the computer 14, steps 105-240 are performed and the video is sent to the computer 14 seamlessly without requiring any further interaction by the operator of the computer 14. Further, steps 105-240 are performed quickly, such as in a matter of seconds, regardless of the connection speed of the computer 14 over the network 16. Thus, it is likely that the operator of the computer 14 will not realize that steps 105-240 are being performed to determine the appropriate version of video to send the computer 14.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A method for seamlessly providing content, the method comprising:
   requesting with a content management computing device a client system to perform one or more operations in response to a request for content;
   sending with the content management computing device data over the network to the client system, wherein the client system needs the data to perform the one or more requested operations;
   calculating with the content management computing device an amount of time taken by the client system to perform the one or more requested operations, wherein a current data transfer rate of the client system is determined based on the calculated amount of time;
   determining with the content management computing device a type of operating system on the client system based on a cookie stored within the content management computing device; and
   providing with the content management computing device the requested content in a format based on the determined current data transfer rate and the determined type of operating system.

2. The method as set forth in claim 1 wherein the calculating an amount of time taken by the client system to perform the one or more requested operations further comprises measuring the amount of time from when the one or more operations are requested until the client system completes performing the one or more operations.

3. The method as set forth in claim 1 wherein the requesting the client system to perform one or more operations further comprises instructing the client system to render one or more images.

4. The method as set forth in claim 1 wherein the data sent over the network to the client system comprises one or more image files.

5. The method as set forth in claim 4 wherein a size of one or more of the image files is in a range between forty and seventy kilobytes.

6. The method as set forth in claim 4 wherein a size of one or more of the image files is forty-six kilobytes.

7. The method as set forth in claim 1 further comprising waiting for the client system to complete performing the one or more operations before calculating with the content management computing device the amount of time taken by the client system to perform the one or more requested operations until a maximum time limit has elapsed.

8. The method as set forth in claim 1 further comprising adjusting with the content management computing device the calculated amount of time to account for one or more factors, wherein the current data transfer rate of the client system comprises the adjusted calculated amount of time.

9. The method as set forth in claim 8 wherein the one or more factors comprise at least one of an amount of the data transmitted to the client system over the network, a first estimated amount of time taken to request the client system to perform the one or more operations, and a second estimated amount of time taken by the client system to process instructions for performing the one or more requested operations.

10. The method as set forth in claim 1 wherein the determining the type of operating system on the client system further comprises determining with the content management computing device a version of the determined type of operating system on the client system wherein the providing the requested content is further based on the determined version of the determined type of operating system.

11. A non-transitory computer-readable medium having stored thereon instructions for seamlessly providing content, which when executed by at least one processor, causes the processor to perform:
   requesting a client system to perform one or more operations in response to a request for content;
   sending data over the network to the client system, wherein the client system needs the data to perform the one or more requested operations;
   calculating an amount of time taken by the client system to perform the one or more requested operations, wherein a current data transfer rate of the client system is determined based on the calculated amount of time;
   determining a type of operating system on the client system based on a cookie stored within a content management computing device; and
   providing the requested content to the client system in a format based on the determined current data transfer rate and the determined type of operating system.

12. The medium as set forth in claim 11 wherein the calculating an amount of time taken by the client system to perform the one or more requested operations further comprises measuring the amount of time from when the one or more operations are requested until the client system completes performing the one or more operations.

13. The medium as set forth in claim 11 wherein the requesting the client system to perform one or more operations further comprises instructing the client system to render one or more images.

14. The medium as set forth in claim 11 wherein the data sent over the network to the client system comprises one or more image files.

15. The medium as set forth in claim 14 wherein a size of one or more of the image files is in a range between forty and seventy kilobytes.

16. The medium as set forth in claim 14 wherein a size of one or more of the image files is forty-six kilobytes.

17. The medium as set forth in claim 11 further comprising waiting for the client system to complete performing the one or more operations before calculating the amount of time taken by the client system to perform the one or more requested operations until a maximum time limit has elapsed.

18. The medium as set forth in claim 11 further comprising adjusting the calculated amount of time to account for one or more factors, wherein the current data transfer rate of the client system comprises the adjusted calculated amount of time.

19. The medium as set forth in claim 18 wherein the one or more factors comprise at least one of an amount of the data transmitted to the client system over the network, a first estimated amount of time taken to request the client system to perform the one or more operations, and a second estimated amount of time taken by the client system to process instructions for performing the one or more requested operations.

20. The medium as set forth in claim 11 wherein the determining the type of operating system on the client system further comprises determining a version of the determined type of operating system on the client system wherein the providing the requested content is further based on the determined version of the determined type of operating system.

21. A content management computing device comprising:
   one or more processors;
   a memory coupled to the one or more processors which are configured to execute programmed instructions stored in the memory comprising:

requesting a client system to perform one or more operations in response to a request for content;
sending data over the network to the client system, wherein the client system needs the data to perform the one or more requested operations;
calculating an amount of time taken by the client system to perform the one or more requested operations, wherein a current data transfer rate of the client system is determined based on the calculated amount of time;
determining a type of operating system on the client system based on a cookie stored within the content management computing device; and
providing the requested content to the client system in a format based on the determined current data transfer rate and the determined type of operating system.

22. The device as set forth in claim 21 wherein the one or more processors is further configured to execute programmed instructions stored in the memory for the calculating an amount of time taken by the client system to perform the one or more requested operations further comprises measuring the amount of time from when the one or more operations are requested until the client system completes performing the one or more operations.

23. The device as set forth in claim 21 wherein the one or more processors is further configured to execute programmed instructions stored in the memory for the requesting the client system to perform one or more operations further comprises instructing the client system to render one or more images.

24. The device as set forth in claim 21 wherein the data sent over the network to the client system comprises one or more image files.

25. The device as set forth in claim 24 wherein a size of one or more of the image files is in a range between forty and seventy kilobytes.

26. The device as set forth in claim 24 wherein a size of one or more of the image files is forty-six kilobytes.

27. The device as set forth in claim 21 wherein the one or more processors is further configured to execute programmed instructions stored in the memory further comprising waiting for the client system to complete performing the one or more operations before calculating the amount of time taken by the client system to perform the one or more requested operations until a maximum time limit has elapsed.

28. The device as set forth in claim 21 wherein the one or more processors is further configured to execute programmed instructions stored in the memory further comprising adjusting the calculated amount of time to account for one or more factors, wherein the current data transfer rate of the client system comprises the adjusted calculated amount of time.

29. The device as set forth in claim 28 wherein the one or more factors comprise at least one of an amount of the data transmitted to the client system over the network, a first estimated amount of time taken to request the client system to perform the one or more operations, and a second estimated amount of time taken by the client system to process instructions for performing the one or more requested operations.

30. The device as set forth in claim 21 wherein the one or more processors is further configured to execute programmed instructions stored in the memory for the determining the type of operating system on the client system further comprises determining a version of the determined type of operating system on the client system wherein the providing the requested content is further based on the determined version of the determined type of operating system.

* * * * *